April 7, 1964 L. E. MILLS 3,128,019
PORTABLE BEVERAGE DISPENSER
Filed Dec. 5, 1960 3 Sheets-Sheet 1
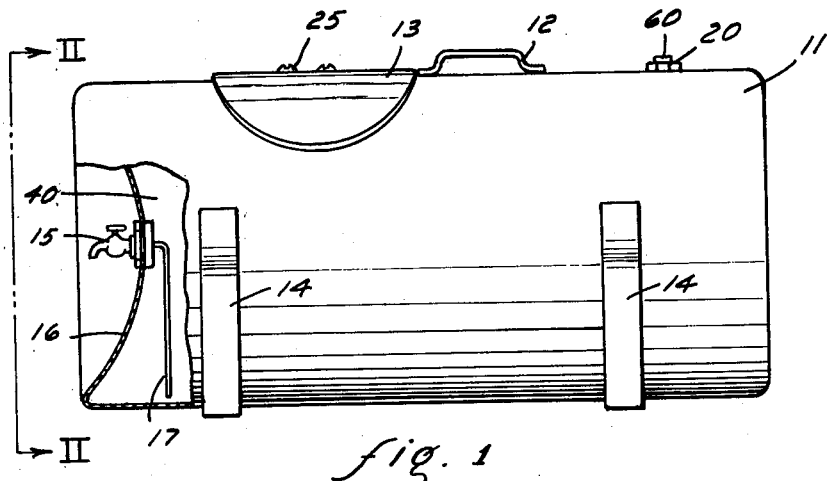
fig. 1
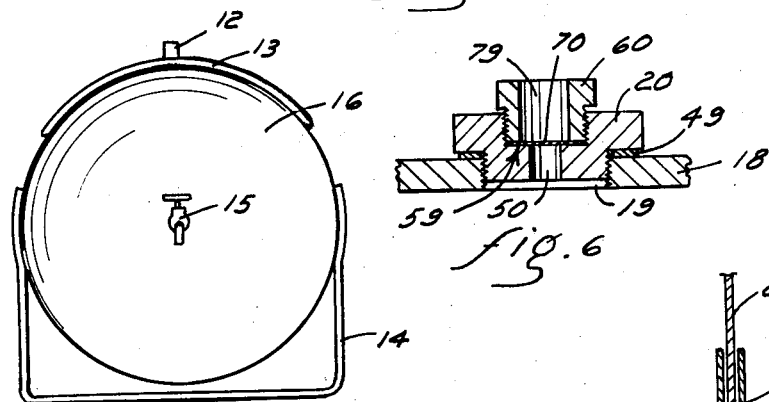
fig. 2
fig. 6
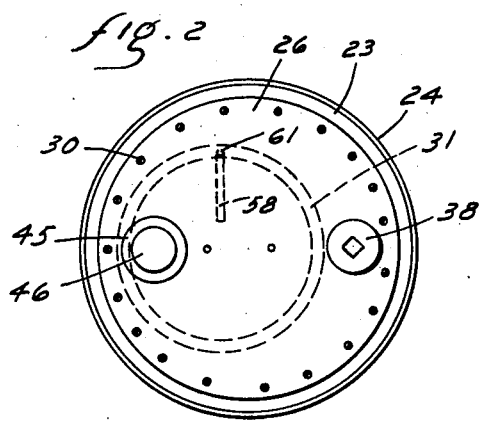
fig. 5
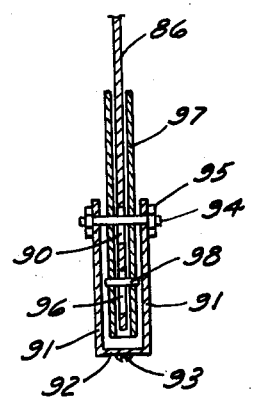
fig. 4
INVENTOR.
BY Lindley E. Mills INVENTOR.
BY Lindley E. Mills April 7, 1964

L. E. MILLS 3,128,019

PORTABLE BEVERAGE DISPENSER

Filed Dec. 5, 1960

INVENTOR.

BY Lindley E. Mills

United States Patent Office 3,128,019
Patented Apr. 7, 1964

3,128,019
PORTABLE BEVERAGE DISPENSER
Lindley E. Mills, Kalamazoo County, Mich.
(518 Pinehurst Blvd., Kalamazoo, Mich.)
Filed Dec. 5, 1960, Ser. No. 73,667
10 Claims. (Cl. 222—396)

This invention relates to a dispenser for beverages, particularly to a portable dispenser for carbonated beverages.

Many beverages, such as certain soft drinks, beer, ale and the like, contain dissolved carbon dioxide. At the usual dispensing temperature of about 40° F. such carbonated beverages usually contain sufficient dissolved carbon dioxide to cause the beverage to exert a pressure of from 8 to 15 pounds per square inch. Beer, for example, usually contains sufficient dissolved carbon dioxide to create a pressure of 11 or 12 lbs. per sq. in. (gauge) in a closed container at 40° F. Generally the pressure exerted by such beverages at 32° F., or slightly below, is approximately equal to atmospheric pressure and it is thus possible to transfer the beverage, e.g. to fill containers with it, at atmospheric pressure provided it is kept at this temperature.

Because carbonated beverages are usually served to a consumer at roughly 40° F., the container in which the beverage is contained before serving is under pressure. As soon as the container is opened carbon dioxide begins to escape from the liquid beverage and this volatilization of the carbon dioxide continues more or less slowly until the pressure exerted by the remaining dissolved carbon dioxide is the same as atmospheric pressure, even though the temperature of the dispensed beverage is held at the dispensing temperature of 40° F. For this reason it is highly desirable that a carbonated beverage be consumed as soon as possible after it is withdrawn from the container, since the loss of more than a relatively small proportion of dissolved carbon dioxide from the beverage causes it to taste "flat."

It is not practical for a consumer to merely purchase a large container of a proper carbonated beverage and to then dispense the beverage from the container in individual servings as required. When this is done the volume of liquid remaining in the container becomes less and less and more and more of the carbon dioxide dissolved in the remaining liquid vaporizes in the container and remains therein in the gaseous phase. The net result is that the pressure in the container becomes less and less as more and more beverage is dispensed and the proportion of carbon dioxide remaining dissolved in the undispensed portion of the beverage also becomes less and less. In many instances as much as the last 15 percent of the beverage becomes under-carbonated to such a degree that it is no longer palatable and must be discarded. Sometimes the pressure in the container decreases to atmospheric pressure and no further beverage will flow from the inverted container. These effects persist regardless of the size of the container.

The foregoing problems are not encountered to a significant degree in commercial establishments where large numbers of servings of carbonated beverages are made during relatively short periods of time and where it is convenient to install more costly and more complicated dispensing apparatus than it is possible to install in the home or in other comparable locations. Carbonated beverages are usually delivered to commercial establishments in large containers, such as kegs, which hold several gallons. The beverage is dispensed from these larger containers as needed after cooling to the dispensing temperature and arrangements are made to maintain the pressure in the keg relatively constant until it is completely empty. The usual arrangement is to provide a strong, steel cylinder containing liquid carbon dioxide under high pressure and, by means of suitable conduits and a system of pressure-reducing valves, to allow carbon dioxide to flow from the cylinder into the keg as needed to maintain the pressure in the keg constant. Under such conditions the degree of carbonation of the beverage remains essentially the same until all of the beverage has been used. It is clear that such installations are costly and uneconomical except in establishments where large volumes of beverage are served. It is equally clear that such an installation can by no stretch of the imagination be considered to be a "portable" installation.

Because of the foregoing considerations, it has heretofore been imperative for carbonated beverages which are to be consumed in the home or in other places where single servings are generally consumed at one time to be packaged in containers, such as cans or bottles, which usually contain a single serving or, at most, three or four servings. Because of this fact, the container cost in the packaging of beverages for such use is excessive and burdensome. If the container is not discarded when empty, it must be returned for credit on a new purchase, neither of which procedures is desirable or economical.

It is clear that any improvement in the packaging and dispensing of carbonated beverages for use in the home and in locations, generally, where the cost of a conventional pressuring system as presently practiced in commercial establishments is not justified or feasible would be of considerable value. In particular, the provision of a portable dispenser adapted to contain two or three gallons, or even more, of a carbonated beverage from which the beverage could be dispensed as desired with a substantially uniform degree of carbonation at the dispensing temperature of all of the bevarage in the container, especially if the container could be refilled and used over again repeatedly, would add greatly to the economy and convenience of using carbonated beverages in places other than in commercial establishments. The discarding or returning for credit of small cans or bottles would be eliminated entirely, thus leading to a greatly increased economy in the packaging of the beverage and also eliminating the bothersome problem connected with the use of such beverages when available only in small packages. Furthermore, the convenience of having such a beverage available and ready at all times for dispensing would clearly add to the consumption of the beverage.

The present invention is, therefore, concerned with a beverage container and dispenser for carbonated beverages which is portable, which eliminates the wastage and return for credit of containers inherent in the use of small packages containing one or only a few servings of a beverage, which may be large enough to contain any desired number of servings of the beverage within the limits of portability and which, additionally, maintains the optimum degree of carbonation of the beverage until it is all dispensed from the container, even though this may be for a matter of days or weeks, or even longer.

Briefly, these desirable results are accomplished by providing a container of suitable size comprising within the confines of the container a beverage chamber adapted to contain a carbonated beverage and a gas chamber adapted to contain gaseous carbon dioxide under a convenient pressure greater than the pressure exerted by the beverage when at the dispensing temperature. Means are also provided within the container to sense the pressure exerted by the carbonated beverage in the beverage chamber and, when this pressure falls below the desired dispensing pressure at the dispensing temperature, to admit a sufficient quantity of carbon doxide gas from the gas chamber into the beverage chamber to restore the pressure therein to the dispensing pressure. In this way the pressure in the beverage chamber is maintained with little or no variation at the optimum dispensing pressure so long as the dispensing temperature is maintained essentially uniform, regardless of the amount of the beverage dispensed. All of the beverage can thus be dispensed without danger of its becoming flat and unpalatable because of under-carbonation.

It is to be noted that in commercial establishments the carbon dioxide is supplied from a cylinder under high pressure, i.e. under a pressure of 1,000 to 1,100 lbs. per sq. in., by way of a costly and complicated reducing valve, both the carbon dioxide cylinder and the reducing valve being permanently installed and being located outside the keg or other container from which the beverage is being dispensed. Because of the great difference between the pressure in the carbon dioxide supply cylinder and the pressure in the interior of the beverage container, and because the pressure in the beverage container must be maintained as nearly constant as possible, a specially constructed and, therefore, costly reducing valve must be employed. Generally such valves are constructed so that the pressure is reduced in two or three, or even more, steps. However, with such a valve it is entirely possible in such large-scale operations to effect the pressure reduction with an adequate degree of accuracy because the pressure in the supply cylinder remains essentially constant until the cylinder is practically empty. It is, of course, apparent that the provision of such a source of supply for carbon dioxide for a portable dispensing container, such as that with which the present invention is concerned, is neither desirable nor feasible, both because of the inadvisability of furnishing even small containers of liquid carbon dioxide under the attendant high pressure to be handled by the general public and because of the uneconomic cost of providing the necessary complicated reducing valve system for use with a relatively small portable container.

These difficulties as they apply to a portable beverage container and dispenser are overcome in part in the apparatus of the present invention by providing a gas chamber within a portable container in which a supply of carbon dioxide is stored which is large enough, in comparison to the size of the beverage chamber, also within the portable container, in which the beverage is contained, to avoid the necessity of such extreme pressure in the gas chamber as exists normally in vessels containing liquid carbon dioxide. The amount of carbon dioxide required to dispense all of the beverage from the beverage chamber of the apparatus for each filling of the beverage chamber is only that amount necessary to fill both the beverage chamber and the gas chamber with carbon dioxide at the dispensing pressure, e.g. at about 12 lbs. per square inch (gauge) at the dispensing temperature. It thus becomes possible to provide an adequate supply of carbon dioxide in a gas chamber which is not unduly large in comparison with the volume of the beverage chamber but which, at the same time, is large enough to contain the required amount of carbon dioxide at a pressure which is not sufficiently high either to create a dangerous condition or to require the use of a complicated gas release mechanism to insure the release of carbon dioxide from the gas chamber intermittently at the rate required. As exemplifying these points, it can, for instance, be assumed, without in any way limiting the invention, that the capacity of the beverage chamber could be nine times the capacity of the gas chamber. Under such a condition and assuming that the required dispensing pressure to be maintained in the beverage chamber at 40° F. is 12 lbs. per square inch (gauge), or 26.7 lbs. per sq. in. (absolute), and assuming, further, that the gas chamber is initially charged with an amount of carbon dioxide just sufficient to fill both the gas chamber and the beverage chamber at a pressure of 12 lbs. per sq. in. at 40° F., calculation will show that the maximum pressure in the fully charged gas chamber, also at 40° F., would be only about 240 lbs. per sq. in. (absolute), or about 225 lbs. per sq. in. (gauge), the actual pressure differential between the two chambers thus being in the neighborhood of 210 lbs. per sq. in. Considering the fact that, as will be apparent later, the gas chamber is practically completely surrounded by the beverage chamber, it is clearly apparent that, should any unduly rapid or accidental release of carbon dioxide from the gas chamber occur, an unduly high pressure could not conceivably be built up in the beverage chamber and the element of danger is, therefore, reduced to a minimum. Even were all of the carbon dioxide in the gas chamber to be released into the beverage chamber, e.g. by way of a leaky valve or the like, before any of the beverage had been dispensed, calculation will show that, because of the solubility characteristics of carbon dioxide in an aqueous beverage, the maximum possible pressure which would be likely to occur in the beverage chamber would be in the neighborhood of 38 to 40 lbs. per square inch (gauge). Clearly this presents no hazard employing a well constructed container.

Because of the fact that, under the conditions just described, the pressure in the gas chamber decreases as the beverage is dispensed from the beverage chamber, i.e. from the initial pressure to approximately the dispensing pressure, whereas the pressure in the beverage chamber must remain as nearly constant as possible, it is not possible to employ a conventional type reducing valve which operates between the pressures in these two chambers to release carbon dioxide into the beverage chamber as required. The present invention, therefore, also provides means operating between the dispensing pressure in the beverage chamber and a source of supplemental, essentially constant pressure, e.g. a suitable spring arrangement entirely unrelated to the pressure in the gas chamber, to operate the mechanism which allows carbon dioxide to flow from the gas chamber into the beverage chamber. In this way a suitably constant dispensing pressure is maintained in the beverage chamber at the dispensing temperature without difficulty and without the use of costly and complicated apparatus and the entire apparatus becomes truly portable without at the same time suffering from the defects of heretofore proposed portable dispensing apparatus.

The invention can be understood readily by reference to the accompanying drawing wherein, in the interest of clarity, certain features are shown on a somewhat exaggerated scale and wherein:

FIGURE 1 is an elevation, partly in section, of a portable beverage container embodying features of the invention;

FIGURE 2 is an elevation taken along the line II—II of FIGURE 1;

FIGURE 4 is a partial elevation, principally in section, taken along the line IV—IV of FIGURE 3;

FIGURE 5 is a partial plan view taken along the line V—V of FIGURE 3 with certain of the parts removed;

FIGURE 6 is a partial sectional elevation taken along the line VI—VI of FIGURE 3;

Figure 3:
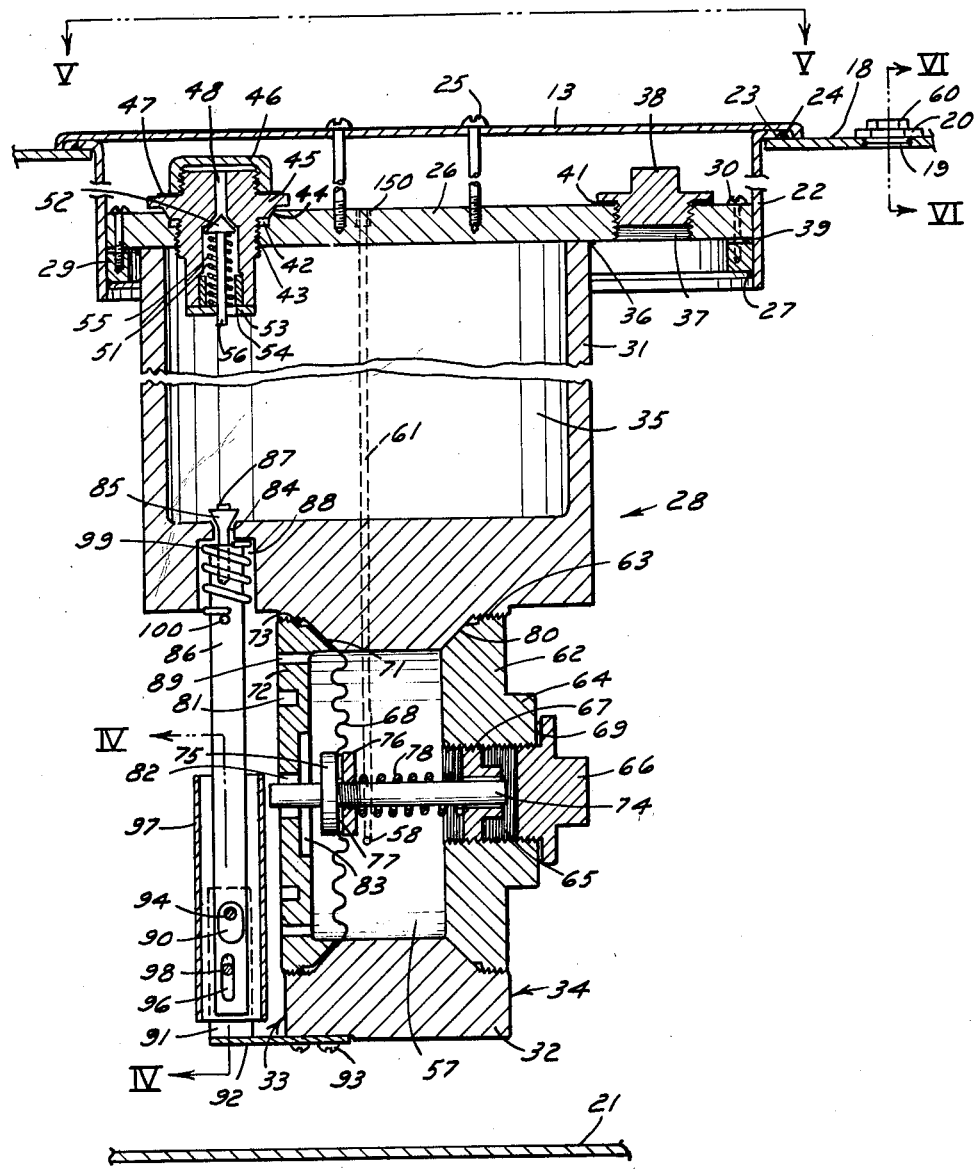
FIGURE 3 is a partial elevation, principally in section and greatly enlarged, showing certain parts of the apparatus of the invention.

Referring now to FIGURE 1, there is illustrated at 11 a container which may be of any suitable size and shape and which for ease in carrying may be provided with a suitable handle 12. A cover plate 13 illustrated in FIGURE 1 will be referred to in more detail later. The container 11 is preferably provided with legs or a stand 14 to support it when at rest. In the case of the cylindrical container illustrated, the stand 14 may comprise one or more straps, the ends of which are secured, as by welding, to opposite sides of the container and each extending downwardly and laterally beneath the container with a flat section by means of which the cylindrical container is prevented from rolling and maintained in the desired "upright" position when placed on a table or other support. It should be noted that in the ensuing description the use of the terms "upper" and "lower" and their equivalents, and related terms, generally has reference to the relationship of the parts when the container is in its normal dispensing position resting on the supports 14.

The container 11 is fitted with a suitable draw-off valve or spigot 15 through which a carbonated beverage can be withdrawn from the container in portions or individual servings as desired. In the modification illustrated in FIGURE 1 the end sections 16 of the container 11 are shown as being dished inwardly and the draw-off valve 15 is located at the center of one of the dished end sections where it is protected from injury should the container be stood on its end. A down pipe 17 is provided inside the container communicating in any convenient way in gas-tight fashion through the end section 16 with the valve 15 and having its open lower end closely adjacent to the bottom of the container with the latter in its normal position resting on the support members 14. The provision of the down pipe 17 enables substantially all of a beverage to be dispensed from the container even though the draw-off valve 15 is located some distance above the bottom of the container.

Referring now to FIGURE 3, there are illustrated certain of the parts and their relationship to one another by means of which a carbonated beverage contained at a dispensing temperature in the dispensing container of the invention can be dispensed essentially entirely over a period of time at essentially the same dispensing pressure and at essentially the same degree of carbonation. In the modification illustrated in FIGURE 3, as well as the modification of FIGURE 7, parts of the upper container wall 18 and of the lower container wall 21 are shown, it being understood that the location of the lower container wall 21 with respect to the other parts of the apparatus shown may be greatly distorted since, in actual practice, the lower wall 21 of the container may be located either closer to or much farther from the rest of the parts illustrated than would appear to be the case from FIGURE 3.

A suitable section, preferably circular, of the upper container wall 18 is cut away to leave a suitably dimensioned opening in the upper wall, preferably an opening fitting closely a cylindrical member to be located in the opening. A suitable member 22, herein for convenience referred to as a "plate hanger," is provided which in the instance illustrated is an essentially circular ring of adequate length and diameter to fit the hole left by cutting away the section of the upper wall 18 of the container. The plate hanger 22 is provided at its upper end with an out-turned flange 23 which, with the plate hanger located in the opening in the upper wall of the container, lies snugly on the edge of the wall 18 around the edge of the opening. The flange 23 is then secured, e.g. by welding as at 24, to the upper wall of the container to provide a gas- and liquid-tight joint between the plate hanger 22 and the upper wall. A cover plate 13 of suitable configuration, mentioned previously, can, if desired, be provided which covers the out-turned flange 23 and the weld 24 to provide a neater appearance and to protect certain of the parts, which will be referred to later, from damage. In the modification illustrated the cover plate 13 is retained in its position extending over the flange 23 and the weld 24 by a pair of cover screws 25 which will be referred to later. The lower end of the plate hanger 22 suitably lies in a plane perpendicular to the longitudinal axis of the member. A suitably heavy plate 26, herein for convenience referred to as a "filler plate" is provided which fits snugly inside, and is secured to, the lower end of the plate hanger 22. Although the filler plate 26 can be secured directly to the plate hanger 22 in any convenient fashion, it is preferable that it be secured removably in place to provide access to the interior of the container, when desired, and to facilitate removal of certain of the parts for adjustment and repair should this become necessary. In the modification shown, a suitably heavy circular filler plate support ring 29 is provided which fits snugly inside the lower end of the plate hanger 22 and which is secured permanently thereto, as by welding at 27. The filler plate 26 is then secured to the upper surface of the support ring 29, e.g. by suitable screws 30. A suitable gasket 39 can be inserted between the plate 26 and the ring 29 to insure a gas- and liquid-tight seal between them.

In the modification of FIGURE 3, a member shown, generally, at 28 and herein for convenience referred to as a "body member" is provided. The body member 28 may conveniently be formed with its upper section 31 circular and with its lower section 32 provided with opposed flat parallel faces 33 and 34 formed by milling away opposite sides of the lower end of the circular member to the desired extent. The upper section 31 of the body member comprises a cavity 35 which, as will be seen later, is adapted, when closed, to contain carbon dioxide gas under pressure and which will hereinafter be referred to as a "gas chamber." The upper end of the upper section 31 of the body member is secured to the under surface of the filler plate 26, e.g. as by welding, at 36, thus completing the enclosure of the gas chamber 35. The part of the interior of the container 11 not occupied by the body member 28 and associated parts, designated by the reference numeral 40 of FIGURE 1, is adapted to contain the carbonated beverage which is to be dispensed and is herein referred to accordingly as a "beverage chamber."

The filler plate 26 is provided with a threaded filler port 37 through which carbonated beverage can be introduced into the beverage chamber 40. The filler port 37 can be closed with a suitable threaded filler port plug 38 in conventional manner, a suitable gasket 41 being employed if desirable or necessary to provide a gas- and liquid-tight fit of the plug 38 in the port 37.

The filler plate 26 is also provided with a suitable gas filler port 42 which communicates with the gas chamber 35. The wall of the port 42 is threaded along its lower section, as at 43, and is flared around the upper end of the port to provide an accurately ground metal valve seat. A suitable gas filler port plug 45 is provided which is threaded to engage the threads 43 of the port 42 and which is also ground accurately on its exterior surface to fit the ground seat to form a ground metal-to-metal seal 44. The outer end of the plug 45 is threaded exteriorly to accommodate a cover cap 46 in gas-tight fashion, a suitable gasket 47 also being employed if desirable or necessary to insure a gas-tight fit of the cover cap 46.

The gas filler port plug 45 is drilled axially to provide a relatively small gas conduit 48 through the upper section and a somewhat larger spring chamber 51 through its lower section. A ground valve 52 located principally in the spring chamber 51 engages a correspondingly ground seat at the lower end of the gas conduit 48 to provide a gas-tight seal when the valve is seated. The lower end of the spring chamber 51 is threaded interiorly to receive a suitable threaded bushing 53. A spring 55 is retained between the shoulder of the valve 52 and the bushing 53 under slight compression so as to maintain the valve 52 normally in seated position. The valve stem 56 protrudes downwardly through a loosely fitting port in the bushing 53 to maintain the valve in approximately proper alignment, the port having suitable longitudinal gas-conducting grooves 54 cut at suitable locations around its circumference to insure free passage of gas alongside the valve stem 56. When it is desired to fill the gas chamber 35 with carbon dioxide, it is merely necessary, with the cover plate 13 removed, to unscrew the cover cap 46 and to screw a suitably threaded fitting on the end of a carbon dioxide supply line or hose onto the plug 45 and to then admit carbon dioxide from a conventional pressure cylinder by way of a suitable reducing valve into the gas chamber 35 until the desired amount of carbon dioxide is contained in the chamber. The amount of carbon dioxide introduced into the gas chamber 35 can be estimated with sufficient accuracy by means of a pressure gauge in the supply line, or in any other convenient fashion.

The lower section 32 of the body member 28 is bored between the opposed flat faces 33 and 34 to provide a relatively large circular opening through the section. As will be apparent, the central part of the circular opening is closed at both its ends, thus providing a chamber 57 which contains a diaphragm spring, to be referred to later, and the chamber will, therefore, be herein referred to as a "diaphragm spring chamber" or, sometimes merely as a "diaphragm chamber." A small hole 58 is drilled laterally parallel with the flat faces 33 and 34 from the outside surface of the lower section 32 of the body member into the chamber 57 and the outer end of the conduit thus formed is threaded and closed in gas- and liquid-tight fashion by a suitable plug, not shown. Another hole 61 is drilled downwardly through the filler plate 26, the wall of the gas chamber 35 and the lower section 32 of the body member until it intersects the hole 58 between the air chamber 57 and the plug closing the outer end of the hole. The holes 58 and 61 thus provide for free flow of air between the air chamber 57 and the space between the cover plate 13 and the filler plate 26. Since the cover plate 13 is not seated in gas-tight relationship with the out-turned flange 23, the pressure in the chamber 57 remains at atmospheric pressure. However, in a modification which will be described later provision is made for maintaining the pressure in the diaphragm spring chamber 57 at a pressure different from atmospheric pressure.

One end of the diaphragm spring chamber 57 is closed by a suitable plug 62 which is threaded exteriorly and which engages threads 63 on the interior surface of an enlarged end section of the bore through the lower section 32 of the body member 28. The surface of the bore between the threads 63 and the end of the chamber 57 is suitably sloped and ground accurately to cooperate with a correspondingly ground sloping surface encircling the plug 62 to form a gas-tight ground metal-to-metal seal 80 when the plug 62 is seated. The plug 62 is provided with suitable means for turning it tightly into its seated position, such as a projecting central section 64 formed with exterior shoulders to accommodate a wrench. The plug 62 is also provided with a centrally located internally threaded axial bore 65 into which a suitably threaded plug 66 can be screwed to close the port in gas-tight fashion, a suitable gasket 69 being employed if desirable or necessary. A threaded, axially bored runner 67 is also screwed into the port 65 ahead of the plug 66 for purposes which will be apparent later.

The end of the diaphragm spring chamber 57 opposite the plug 62 is closed by a flexible diaphragm 68 which is constructed of a circularly corrugated flexible metal or plastic sheet or of other material which leads to flexing of the diaphragm axially of the chamber 57 in response to unequal pressures on its two sides. The outer edge of the diaphragm can be sloped outwardly away from its center and away from the plug 62 and adapted to fit snugly against a correspondingly sloping shoulder 71 encircling the bore adjacent to the end of the chamber 57, the end of the bore being suitably enlarged. A suitable diaphragm-retaining plug 72 is provided which is threaded exteriorly to engage threads 73 cut in the wall of the enlarged section of the bore through the member 32 and which is formed at its inner end with an encircling suitable sloping face adapted to engage the outer edge of the diaphragm 68 and to press it against the sloping shoulder 71 to form a liquid- and gas-tight seal between the sloping edge section of the diaphragm 68 and the shoulder 71.

The diaphragm 68 is provided with a hole at its center through which is inserted a diaphragm rod 74. A diaphragm rod flange 75 is formed integral with the rod 74 so as to encircle it and to press against the surface of the flat central section of the diaphragm 68 opposite the chamber 57. The section of the rod 74 immediately adjacent to the diaphragm 68 on the inside of the chamber 57 is threaded exteriorly to accommodate a diaphragm nut 76. When the nut 76 is tightened with the central section of the diaphragm and the flange 75, a gas-tight seal is provided preventing the flow of gas or liquid into or out of the chamber 57 along the rod 74. If desirable or necessary, a suitable gasket 77 can be installed between the nut 76 and the diaphragm 68 to insure a gas-tight seal, although this is usually unnecessary. The diaphragm rod 74 is prolonged in the direction of the plug 66 sufficiently far to enter and fit loosely in the axial bore in the runner 67, by which means the rod 74 is maintained in essentially accurate alignment. A suitable coil diaphragm spring 78 encircles the rod 74 and is compressed between the diaphragm nut 76 and the runner 67. By removing the plug 66 and then rotating the runner 67 in the threaded bore 65, the runner can be caused to assume a position either closer to or farther away from the diaphragm nut 76 and the compression on the spring 78 thus increased or decreased, respectively.

The diaphragm-retaining plug 72 is provided with suitable means, e.g. two or more sockets 81 in its outer face into which a suitably pronged wrench can be inserted, for tightening or loosening the plug. The plug 72 is also provided with an axial bore 82 large enough to permit the end of the diaphragm rod 74 to move longitudinally in it without restriction. Movement of the diaphragm rod 74 and flexing of the diaphragm 68 in the direction of the diaphragm-retaining plug 72 for a distance sufficient to deform the diaphragm permanently in response to the urging of the spring 78 is prevented by the diaphragm rod flange 75 contacting the inner face of the diaphragm-retaining plug 72. If desirable or necessary, the inner face of the plug 72 can be cut away to form a depression 83 to allow sufficient flexing of the diaphragm in the direction of the plug 72. The diameter of the depression 83 should, of course, be greater than the diameter of the flange 75. Undue flexing of the diaphragm in the opposite direction can be prevented by dimensioning the parts properly to provide for contacting the end of the diaphragm rod 74 with the face of the plug 66 before damage to the diaphragm occurs. Suitable drain ports 89 are also preferably provided near the periphery of the plug 72 to facilitate drainage of liquid from the space between the plug and the diaphragm 68.

A gas-escape port 84 is drilled in the bottom of the gas chamber 35 in axial alignment with the gas filler port 42, and the rim of the port facing the interior of the gas chamber is flared outwardly and ground accurately to form a seat for a gas-escape valve 85. The valve 85 is provided with a short stem which projects downwardly and which is threaded externally and screwed into an internally threaded socket in the upper end of an elongated main gas-escape valve stem 86. The stem 86 projects downwardly for a suitable distance, conveniently to almost even with the lower end of the lower section 32 of the body member 28. Securing of the valve 85 to the valve stem 86 is facilitated by the provision of a shouldered projection 87 on the upper surface of the valve 85 adapted to be engaged by a socket wrench inserted through the gas filler port 42. The gas-escape valve stem 86 is sufficiently strong and rigid to cause the valve 85 to tip on its seat slightly in response to a minimum amount of lateral movement of the lower end of the stem. The pressure of gas in the gas chamber 35 will keep the valve seated normally in gas-tight relationship with its seat. When, however, the valve 85 is tipped even slightly, gas is allowed to escape slowly from the gas chamber 35 through the gas-escape port 84 into the beverage chamber. It is usually advisable to enlarge the lower section of the gas-escape port 84, as illustrated at 88, to provide adequate room for the upper end of the valve stem 86 since it is advisable that the area of the port 84 be relatively small. Suitable additional lightly tensioned spring means, such as a spring 99 bearing at its upper end against the end of the enlarged section 88 of the gas-escape bore and at its lower end on a suitable pin inserted through the stem 86, can, if desirable or necessary, be employed to further insure a tight fit of the valve 85 on its seat. This may be particularly desirable to prevent any sudden movement or jostling of the container from causing the valve stem 86 to swing as a pendulum and allow the escape of carbon dioxide from the gas chamber 35 even when the escape valve is not actuated by the diaphragm rod 74.

Provision for effecting the tipping of the valve 85 on its seat in response to flexing of the diaphragm 68 outwardly of the diaphragm spring chamber 57 can include a bracket in the form of a yoke having parallel arms 91, as shown more particularly in FIGURE 4. The base 92 of the yoke connecting the arms 91 at one of their ends is prolonged laterally and secured to the lower surface of the section 32 of the body member, as with screws 93. A swivel pin 94 extends between and through the arms 91 and is secured in place by means of a pair of nuts 95 engaging its threaded ends. The valve stem 86 is provided near its lower end and below the level of the swivel pin 94 with a suitable slot 96 extending longitudinally of the stem.

An elongated, conveniently rectangular, tubular swivel rod or member 97 is mounted to swivel on the swivel pin 94, the pin extending through the side walls of the member 97 and through a suitably large hole 90 in the valve stem 86. The pin 94 is preferably essentially centered with respect to the length and width of the swivel member 97 to avoid any undue tendency of the latter to swing as a pendulum when the container is jarred or moved suddenly. The rectangular opening through the swivel member 97 should be wide enough to accommodate the valve stem 86 without binding and the yoke arms 91 should be spaced far enough from one another to accommodate the member 97 without binding. The opening 90 should also be long enough to allow sufficient movement of the valve stem 86 to cause adequate tipping of the valve 85 on its seat. A second swivel pin 98, retained against undue longitudinal movement between the yoke arms 91, passes through suitable holes in the lower part of the swivel member 97 and through the slot 96 in the valve stem 86, the slot being wide enough to accommodate the pin 98 without binding but not wide enough to allow more than a minimum amount of free lateral play of the pin in the slot, to insure full seating of the valve 85 without causing the member 97 to swivel unduly on the pin 94. The swivel member 97 extends upward from the swivel pin 94 to a position even with or slightly above the adjacent end of the diaphragm rod 74, the end of the rod being prolonged suitably and the tension on the diaphragm spring 78 being adjusted until, with equal pressures on the opposite sides of the diaphragm 68, the end of the rod clears, but lies very closely adjacent to, the upper end of the swivel member 97.

It is apparent that, with the arrangement just described, any appreciable flexing of the diaphragm 68 outwardly of the chamber 57 due to an excess of pressure exerted on the diaphragm by the spring 78 and the pressure of the atmosphere in the chamber 57 over that exerted on its opposite side by the beverage will cause the diaphragm rod 74 to press against the upper end of the adjacent edge of the swivel member 97, causing it to rotate around the swivel pin 94 and, by its action on the pin 98, to move the lower end of the valve rod 86 laterally and thus cause the valve 85 to tip on its seat. When this occurs carbon dioxide escapes slowly from the gas chamber 35 into the beverage chamber and the pressure therein increases until it is essentially equal to the pressure in the chamber 57, the diaphragm rod moving longitudinally inwardly of the chamber 57 until the valve 85 closes. With the tension on the spring 78 adjusted so that its pressure, plus the pressure of the atmosphere, on the diaphragm is the same per unit area of diaphragm as that which a beverage at the dispensing pressure and temperature in the beverage chamber exerts on the opposite side of the diaphragm, this action continues as beverage is withdrawn from the beverage chamber, the pressure in the beverage chamber being maintained continuously at essentially the dispensing pressure and the beverage, therefore, remaining at essentially the same degree of carbonation. Since the pressure in the beverage chamber is thus at all times considerably greater than atmospheric pressure, the last traces of beverage will be forced out of the beverage chamber through the downpipe 17 upon opening the spigot 15. There is thus no decrease in the degree of carbonation in the last servings of the beverage and the amount of beverage which cannot be dispensed is practically nil, being determined only by the closeness of the lower end of the downpipe 17 to the lower side of the container.

For ease of washing and sterilization of the apparatus between fillings, it is desirable to provide a drain port which can be opened as desired to allow all liquid to drain from the container. It is also sometimes desirable, in the interest of conserving material from which the container is constructed, to provide a safety device to relieve the pressure in the beverage chamber should inadvertent rapid leakage of carbon dioxide through the gas-escape valve 85 into the beverage chamber 40 occur, especially when the beverage chamber is nearly full of beverage and there is very little gas space in the chamber. Should leakage of carbon dioxide from the gas chamber 35 into the freshly filled beverage chamber occur at a more rapid rate than it is dissolved in the liquid beverage, considerable pressure may develop in the beverage chamber, thus necessitating the use of a heavier walled container than would be necessary under conditions of normal functioning of the apparatus unless means to prevent such a condition is employed. For this reason the provision of a suitable safety means to relieve such excess pressure, should it occur in the beverage chamber, is sometimes advisable. Any suitable means of this sort can be provided.

One convenient combination of drain port and safety means is illustrated, particularly in FIGURE 6, wherein a suitable threaded drain port 19 is illustrated as being provided in the upper wall 18 of the container. The drain port 19 is closed by a suitably threaded drain port plug 20 while the container is in use, a suitable gasket 49 being provided, if desirable or necessary, to insure a gas-tight seal between the plug 20 and the wall 18. A safety feature associated with the drain plug 20 can conveniently be provided by forming the plug 20 with a suitably large axial bore 50 having an outwardly facing flat shoulder 59 formed around its periphery intermediate its ends. The enlarged section of the bore 50 extending outwardly from the encircling shoulder 59 with respect to the interior of the container is threaded interiorly to accommodate a suitable safety plug 60 which is also provided with an axial bore 79. A rupture disk 70 of suitable bursting characteristics is placed on the encircling shoulder 59 and the safety plug 60 is screwed firmly against it, thus preventing the escape of gas from the interior of the container around the edge of the disk 70. Should the pressure in the beverage chamber become greater than a predetermined pressure at which the disk 70 will rupture, the disk will burst and the pressure in the beverage chamber will be relieved by way of the bore 50 in the drain plug 20 and the bore 79 in the safety plug 60.

The apparatus of the invention can be washed, sterilized and refilled easily. This is effected by first removing the cover cap 13, the gas filler plug 45, the filler port plug 38 and the drain plug 20. The spigot 15 is then opened and the container turned upside down and supported on a suitable washing rack with the stand members 14 projecting upward. A steam hose can then be inserted upward into the container through the filler port 37 or the drain port 19 and the steam turned on. It will be noted that during this steaming operation the gas chamber 35, the beverage chamber 40 and the diaphragm spring chamber 57 are all three open to the atmosphere and that under such conditions the tension of the diaphragm spring 78 on the diaphragm will cause the gas-escape valve 85 to remain tilted on its seat. Steam will thus pass downwardly through the gas escape port 84 into the gas chamber 35 and out the gas filler port 42, sterilizing the gas chamber 35 thoroughly. Alternatively, steam can also be introduced by way of a suitable loosely fitting steam pipe inserted through the gas filler port 42 into the gas chamber 35 to speed up the sterilization of the chamber 35, if desired. Any condensate or wash water in the gas chamber 35 drains downwardly from the chamber through the gas filler port 42 and any condensate or wash water in the beverage chamber drains downwardly from the chamber through the drain port 19. Efficient washing and sterilizing of the entire apparatus is thus effected readily. Sterilization can also be effected by autoclaving the entire apparatus after removal of the three plugs 45, 38 and 20, if desirable or necessary.

To refill and recharge the dispenser ready for dispensing a beverage therefrom, it is drained thoroughly and then rested on a support with the stand members 14 extending downwardly in their normal position. It is usually desirable to then flush the entire apparatus with carbon dioxide to remove essentially all of the air from it. This assures somewhat better functioning of the apparatus during dispensing of a beverage from it and in the case of some beverages it is desirable that no oxygen be left in the container. The spigot 15 is then closed, the drain plug 20 is inserted tightly in the drain port 19 and the gas filler port plug 45, with the cap 46 removed, is then inserted tightly in the gas filler port 42. It is desirable to seat the gas-escape valve 85 and close the port 84 before beverage is introduced into the beverage chamber 40. If this is not done, beverage may flow upward through the port 84 into the gas chamber 35 when the level of beverage in the beverage chamber 40 rises above the bottom of the gas chamber, thus decreasing the effective volume of the chamber 35. Seating of the valve 85 can be effected readily by partial evacuation of the spring chamber 57. This can be accomplished easily by providing the end of a suitable conduit, connected at its other end to a source of suction, with a conventional rubber suction cup and pressing the suction cup onto the upper surface of the filler plate 26 so that it encircles the upper end of the vertical hole or conduit 61. Alternatively, the upper end of the hole 61 can be enlarged as at 150 and threaded internally to receive an externally threaded suction conduit fitting in conventional manner. In any event, air is withdrawn from the diaphragm spring chamber 57 by way of the holes 58 and 61 until the pressure in the chamber is reduced sufficiently, e.g. to approximately 2 lbs. per sq. in., to cause the diaphragm rod 74 to move away from, and to disengage, the swivel member 97, whereupon the gas-escape valve 85 seats firmly and closes the gas-escape port 84.

A supply of beverage at 30 to 32° F. is then run into the dispenser, preferably after chilling the dispenser to 30 to 32° F., through the filler port 37 until the beverage chamber has been filled to the correct degree and the filler port plug then sealed tightly. In general, very little gas space, e.g. not more than roughly 5 percent, or even less, of the volume of the beverage chamber, need be left above the beverage in the beverage chamber.

Carbon dioxide is also introduced into the gas chamber 35, e.g. by way of a suitable internally threaded fitting on the end of a carbon dioxide conduit engaging the external threads on the protruding end of the gas filler port plug 45, until the pressure of the carbon dioxide in the chamber 35 has reached a predetermined value indicating that the chamber contains a sufficient amount of carbon dioxide. As indicated previously, the pressure attained in the gas chamber 35 can be judged with sufficient accuracy by means of a conventional pressure gauge on the carbon dioxide conduit leading to the plug 45, provided the spring 55 does not exert too great a tension on the gas filler valve 52. Alternatively, the pressure required to overcome the tension of the spring 55 can be determined in advance and the reading of the pressure gauge corrected accordingly. When the correct amount of carbon dioxide has been introduced into the gas chamber 35, the carbon dioxide conduit is disconnected from the plug 45 and the cap 46 is seated firmly to guard against leakage of carbon dioxide from the chamber through the port 48 should the valve 52 not seat with complete accuracy. The entire apparatus is then allowed to warm up to the dispensing temperature and the suction conduit is disconnected from the upper end of the hole 61, after which the cover plate 13 is secured in place. The apparatus is thus filled with beverage and charged with carbon dioxide and then is in position to dispense beverage from it.

It will be noted that certain of the seals or closures referred to in the foregoing description have been indicated as being ground metal-to-metal seals whereas certain others employing a suitable gasket have been described. In practice, any or all of the seals referred to can be either ground metal-to-metal seals or gasketed seals, as desired. Gaskets employed should, of course, not impart any foreign flavor or aroma or any toxic characteristics to the beverage and those which are heated during sterilization of the apparatus should be adequately heat-stable. Gaskets formed of suitable grades of nylon, polycarbonate or polyfluoroethylene resins are suitable for use in most cases.

Figures 7, 8:
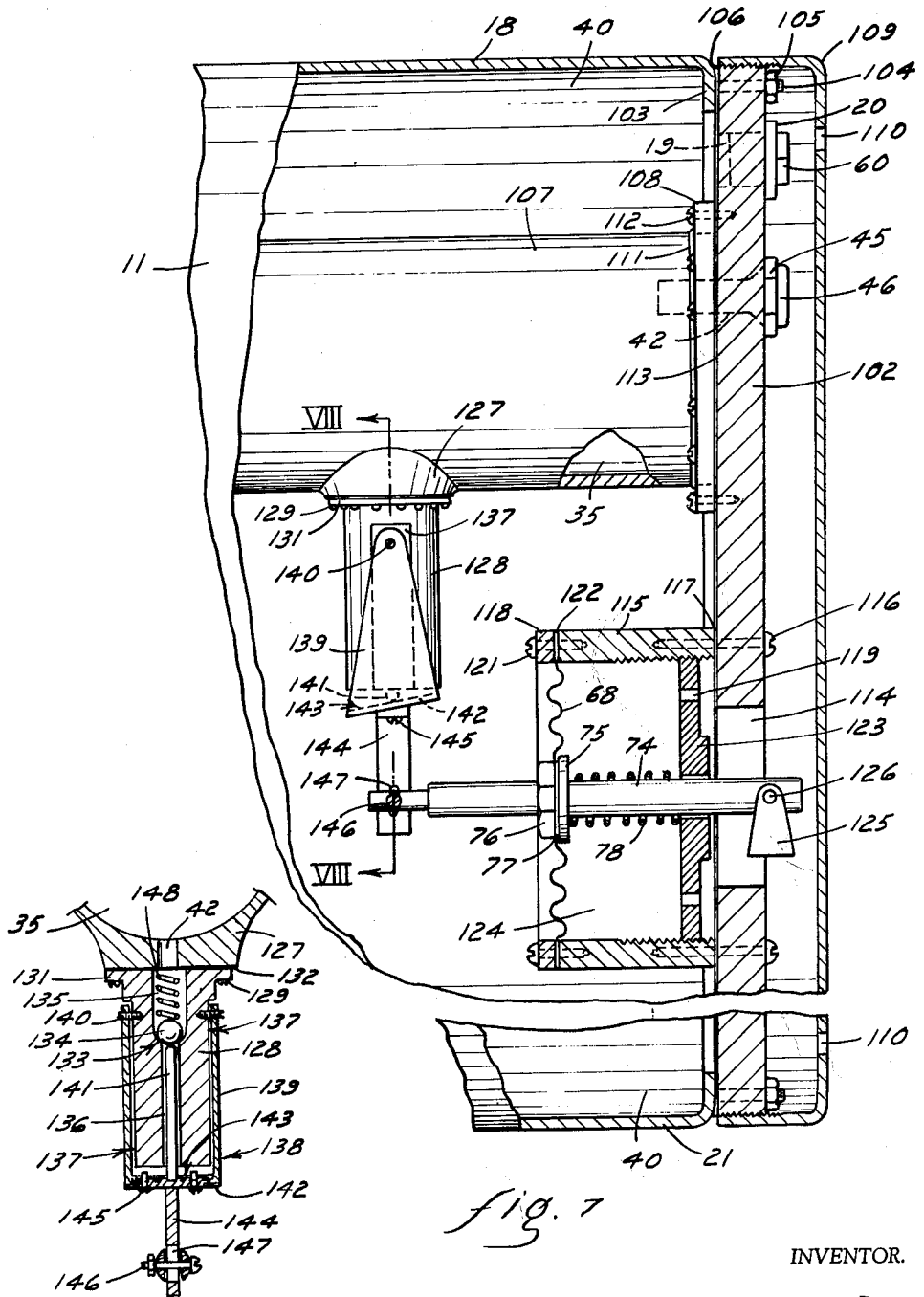
FIGURE 7 is a partial elevation, partly in section, of an alternative arrangement of certain of the parts.
FIGURE 8 is an elevation, principally in section, taken along the line VIII—VIII of FIGURE 7.

Although there has been described in the foregoing paragraphs one modification of the apparatus of the invention, it will be apparent that the apparatus is susceptible to considerable variation without departing from the spirit of the invention. One such variation is illustrated in FIGURES 7 and 8 wherein a container corresponding to the container 11 of FIGURE 1 is provided. The container, as in FIGURE 1, is provided with suitable valve and downpipe means, not shown in FIGURE 7, for drawing off liquid beverage as desired. In the modification illustrated in FIGURE 7 the end of the container opposite the draw-off means is closed by means of a suitably heavy end plate 102. The closure can be effected in any convenient way, one way, as illustrated, being to turn the wall of the container inwardly to form an encircling flange 103 to which a suitable number of bolts or threaded studs 104 are secured, as by welding. The studs 104 extend through suitable holes in the end plate 102 which is drawn down tightly by nuts 105 engaging the threaded ends of the studs, a suitable gasket 106 being inserted between the plate 102 and the flange 103 to insure a gas- and liquid-tight seal. The end plate 102 is conveniently provided with a drain port 19 closed by a combination of drain and safety plugs 20 and 60 similar to those illustrated in FIGURE 6. In this instance the drain port 19 also serves as a filler port through which liquid beverage can be introduced into the container 11. As a matter of protection for certain of the parts and to present a better appearance, the circumference of the end plate 102 can be threaded and a suitable end cap 109 provided which can be screwed over the end plate in the manner shown in FIGURE 7. Care should be taken to provide a suitable hole or port in the cap 109 to allow equalization of the pressure in the space between the end plate 102 and the cap 109 with the atmosphere, both to maintain atmospheric pressure in the chamber 124, which will be referred to later, and to permit the escape of fluid and gas from the apparatus should a safety rupture disk, which will also be referred to later, break for any reason. By providing a plurality of properly spaced holes 110 in the end cap 109, a suitably pronged wrench can be inserted in them to remove or tighten the cap.

The gas chamber 35 is in this instance provided by a cup-shaped, or other suitably shaped, vessel 107 which is secured in gas- and liquid-tight relationship to the inner surface of the end plate 102. As shown in FIGURE 7, this can be accomplished readily by securing a suitable flange 108 around the exterior of the open end of the vessel 107, e.g. as by welding at 111. Screws 112 pass through suitable holes drilled in the flange 108 and engage suitable threaded holes passing partially through the end plate 102, a suitable gasket 113 being inserted between the flange 108 and the plate 102 to insure a gas- and liquid-tight seal. A suitable gas filler port 42 is provided in the end plate 102 communicating with the gas chamber 35. A gas filler port plug 45, similar to that of FIGURE 3, is located in the gas filler port 42 and provided with a cap 46.

A suitable opening or port 114 is also provided in the end plate 102 removed a suitable distance from the section of the plate covered by the flange 108 and the vessel 107. A tubular member 115 of convenient diameter and wall thickness and having planar, usually parallel, end surfaces is secured to the inner surface of the end plate 102 so as to encircle the port 114, thus forming a tubular chamber 124 projecting from the end plate for a suitable distance into the container. The tubular member 115 can conveniently be cylindrical and can be secured to the end plate 102 in any suitable manner, as by welding or as by a series of bolts or screws 116 passing through holes drilled in the end plate around the port 114 and engaging threaded holes drilled in the end of the wall of the member 115. A suitable gasket 117 can be interposed between the end plate 102 and the end of the circular member 115 to provide a gas- and liquid-tight seal. The end of the circular member 115 opposite the end plate 102 is closed by a diaphragm 68 held in place by a diaphragm-retaining ring 118 which is secured, as by screws 121, to the end of the tubular member 115 so as to clamp the circular edge section of the diaphragm firmly in place between them. A suitable gasket 122 can be interposed between the edge of the diaphragm and the end of the circular member 115 to insure a leakproof seal.

In a manner entirely analogous to the arrangement of FIGURE 3 a diaphragm rod 74 is provided which extends through the center of the diaphragm 68 and is secured thereto by a suitable diaphragm rod flange 75, a nut 76 and a gasket 77 between the flange and the diaphragm. The end of the tubular member 115 adjacent to the end plate 102 is threaded interiorly to accommodate a suitably threaded runner 123 which serves to align the diaphragm rod 74 axially and to retain a coil diaphragm spring 78 under compression between it and the diaphragm rod flange 75 and to provide means for adjusting the tension on the spring in a manner similar to the runner 67 of FIGURE 3. The chamber 124 lying within the tubular member 115 thus comprises a diaphragm coil spring chamber corresponding in function to the chamber 57 of FIGURE 3 but is considerably simpler to construct. Suitable ports 119 can be drilled through the runner, if desirable or necessary to insure free communication between the chamber 124 and the atmosphere. The end of the diaphragm rod 74 protruding through the runner 123 is in this instance provided with a suitable key or lock, such as a roughly triangular swivel member 125 which is mounted so as to swivel freely on a swivel pin 126 passing through the rod 74 near its outer end, the purpose of which will be apparent later on.

A suitably located and dimensioned internally threaded gas-escape port 42 is formed at a suitable location in the wall of the vessel 107, preferably through a thickened section 127 thereof, as illustrated more clearly in FIGURE 8. One end of a tubular valve seat member 128 is secured to the planar surface of the thickened wall section 127 in communication with the gas-escape port 42, as by way of a flange 131 encircling the end of the member 128 and suitable screws 129, a suitable gasket 132 being interposed between the flange 131 and the vessel wall section 127 to provide a gas- and liquid-tight seal, if desirable or necessary. The valve seat member 128 is bored longitudinally, the section of the bore adjacent to the flange 131 being enlarged to form a ball chamber 135 in which is located a suitable ball 134 adapted to seat on a ball valve seat 133 formed on the shoulder between the ball chamber 135 and the unenlarged section 136 of the longitudinal bore. A ball seating coil spring 148, under light compression, is located in the ball chamber 135, one end of which bears on the surface of the wall section 127 around the port 42 and the other end of which bears on the ball 134.

The valve seat member 128 is milled to form flat surfaces 137 on opposite sides thereof which extend in planes essentially parallel with the longitudinal axis of the diaphragm rod 74. A U-shaped swivel member, indicated, generally, at 138 of FIGURE 8, is provided having parallel arms 139 separated from one another by a distance slightly greater than the distance between the two flat surfaces 137. The upper ends of the arms 139 are secured so as to swivel on swivel pins 140 inserted in the flat surfaces 137 near their upper ends. The bottom cross member 142 of the U-shaped member connecting the arms 139 at their lower ends is formed with a sloping upper surface 143 facing the lower end of the valve seat member 128, the arms 139 of the U-shaped member being long enough to allow the bottom 142 of the member to clear the lower end of the valve seat member 128 when the member 138 swivels or swings on the pins 140.

A suitable actuator arm 144 is secured, as by screws 145, rigidly to the lower surface of the bottom 142 of the U-shaped member and extends downwardly so as to intersect and extend somewhat beyond the longitudinal axis of the diaphragm rod 74. The adjacent end of the diaphragm rod 74 is prolonged and slotted to accommodate within the slot the lower end of the actuator arm 144 to which it is secured in non-binding relationship, as by a swivel bolt or pin 146 passing transversely through holes in the slotted end of the diaphragm rod 74 and through a suitable vertically extending slot 147 formed suitably near the lower end of the actuator rod 144. A valve pin 141 is located in the lower section 136 of the bore through the valve seat member 128 so that it is free to slide vertically therein while allowing carbon dioxide gas to pass through the bore alongside the pin.

It will thus be seen that, as beverage is withdrawn from the beverage chamber 40 causing a decrease in the pressure therein, the diaphragm 68 will flex away from the end plate 102 causing the diaphragm rod to travel in the same direction and to swing or swivel the U-shaped member 138 away from the adjacent end of the container. The lower end of the valve pin 141, which is preferably rounded, rests slidably on the upper sloping surface 143 of the bottom 142 of the U-shaped member 138, which, as will be noted, slopes downwardly away from the adjacent end plate 102. Flexing of the diaphragm in the direction just mentioned causes the sloping surface 143 to engage the lower end of the valve pin 141 in a sliding manner and causes the pin to travel upward in the bore 136. By making the pin 141 of suitable length, its upper end engages and unseats the ball 134 as soon as the diaphragm rod 74 has traveled for a suitable minimum distance. Carbon dioxide then escapes from the gas chamber 35 by way of the port 42 and the port 135 past the ball 134 and alongside the valve pin 141 into the beverage chamber 40, thus restoring the pressure therein to the original dispensing pressure. This, in turn, causes the diaphragm 68 to flex in the opposite direction, i.e. toward the end plate 102, permitting the ball 134 to again become seated and arresting the flow of carbon dioxide from the gas chamber 35. This action continues until all of the beverage has been dispensed from the beverage chamber 40, without appreciable decrease either in the dispensing pressure or in the degree of carbonation of the beverage.

In the case of the modification illustrated in FIGURES 7 and 8, washing and sterilization of the apparatus is accomplished conveniently by removing the drain plug 20 and the gas filler port plug 45 and, with the dispensing spigot 15 open, positioning the container so that any wash water or condensate will drain from the beverage chamber 40 and from the gas chamber 35 through the drain port 19 and the gas filler port 42, respectively. Steam is then admitted into the beverage chamber 40 by way of a suitable pipe fitting loosely in the drain port 19 and, if desired, by admitting steam into the gas chamber 35 by way of the gas filler port 42. During the steaming operation the ball 134 will remain unseated and steam can pass freely through the valve seat member 128 and the gas-escape port 142.

When the sterilizing operation is complete and the beverage and gas chambers have been drained thoroughly, the spigot 15 is closed and the container is righted into approximately its normal operating position, but with its end to which the end plate 102 is secured being somewhat higher than its other end. In fact, the container can be stood upright on its end opposite the end plate 102, if desired, provided the dispensing spigot 15 is located so that it will not be injured by so doing. The ball 134 is then seated, in this instance by grasping the end of the diaphragm rod 74 which protrudes through the port 114 in the end plate 102 and pulling the rod outwardly through the port until the swivel key 125 can be rotated on its pin 126 sufficiently to allow its swinging end to engage the runner 123, and then releasing the rod. The location of the key 125 prevents flexing of the diaphragm away from the end plate 102 and prevents pressure of the valve pin 141 on the ball 134, thus allowing the ball to seat in response to the tension of the valve spring 148. The gas-escape port plug 45 is then seated tightly and the gas chamber 35 charged to the desired degree with carbon dioxide, e.g. in the way described in connection with FIGURE 3. The desired amount of beverage at a temperature of 30 to 32° F. is then introduced into the beverage chamber 40 through the filler port 19 and the filler port plug 20 seated tightly. When the dispenser and contents have warmed to at least the dispensing temperature, the swivel key 125 is again rotated on its pin 126 to unlock the diaphragm and allow it to operate in its normal manner and the end cap 109 screwed into place. The dispenser is then ready for operation.

It will be apparent from the foregoing description that, for most satisfactory operation of the apparatus of this invention, the tension on the diaphragm spring 78 should be adjusted carefully according to the characteristics of the particular beverage which is to be dispensed at the temperature at which the dispensing is to be done. It is known that the pressure exerted by a carbonated beverage varies considerably with the temperature of the beverage, being greater the higher the temperature due to the increased tendency of the dissolved carbon dioxide to escape in gaseous form from the beverage. As noted previously, certain carbonated beverages exert a pressure of essentially 1 atmosphere at 30 to 32° F. but at temperatures higher than this these same beverages can retain their dissolved carbon dioxide only when under super-atmospheric pressure. Since, in the modifications described, the pressure exerted on the diaphragm chamber side of the diaphragm is the sum of the pressure exerted by the atmosphere and the pressure exerted by the diaphragm spring 78, the tension of the spring 78 should be adjusted to exert a pressure on the diaphragm 68 as nearly as possible equal to the excess over atmospheric pressure exerted by the beverage on the beverage chamber side of the diaphragm at the dispensing temperature.

Should the temperature of the beverage in the beverage chamber be lower than the dispensing temperature, e.g. immediately after the beverage chamber has been filled with a beverage at about 32° F., the pressure which it exerts on the diaphragm will be insufficient to maintain the gas-escape valve in its seated position and some overcarbonation of the beverage is likely to occur. Such overcarbonation will not be excessive but even this small amount of overcarbonation can be avoided by holding the gas-escape valve in its closed position, e.g. by maintaining the vacuum on the chamber 57 of FIGURE 3 or by delaying release of the key 125 of FIGURE 7, both of which provisions have been mentioned previously, until the temperature of the beverage has increased to the dispensing temperature for which the apparatus is set. With the temperature of the beverage in the beverage chamber at the dispensing temperature, no further release of carbon dioxide from the gas chamber will occur, even though the beverage be somewhat overcarbonated, until sufficient beverage has been dispensed to cause the pressure in the beverage chamber to fall to below the dispensing pressure. This condition of overcarbonation, should it inadvertently occur, is thus self-correcting before too great a proportion of the beverage has been withdrawn.

Once the temperature of the beverage has increased to the dispensing temperature, any further increase in the temperature, e.g. during shipping, will be of no consequence since any increase in the pressure exerted by the beverage at such higher temperature will not cause the gas-escape valve to open and carbon dioxide to flow from the gas chamber into the beverage chamber. Should a portion of the beverage be dispensed with its temperature somewhat above the dispensing temperature, this may result in some slight undercarbonation of such first dispensed portions but this condition will be self-correcting for the rest of the beverage as soon as the dispensing temperature has been reached.

It is clearly apparent that the apparatus of the invention can be used without resetting the tension on the diaphragm spring 78 for dispensing any one of a number of beverages so long as the pressures exerted by the different beverages at their respective preferred dispensing temperatures are the same. However, as mentioned above, resetting of the tension on the spring 78 after dispensing one beverage will usually be advisable when the apparatus is to be used for dispensing a different beverage unless the two beverages meet the conditions just mentioned.

Certain modifications of the apparatus of this invention are contemplated to render it more sensitive to changes in pressure in the beverage chamber and, also to provide means to overcome partially or completely the dependence upon temperature of the degree of carbonation of the beverage in the beverage chamber which is maintained. Thus, in one contemplated modification, which can be understood clearly by reference to FIGURE 3, the air pressure in the diaphragm chamber 57 can be maintained at a pressure greater than atmospheric pressure. This can be effected by installing a conventional check valve, not shown, at the enlarged upper end 150 of the conduit 61 so that air can be blown into the chamber 57 and retained therein under any suitable pressure by the check valve. Ordinarily the check valve should be removed while the apparatus is being refilled so that the chamber 57 can be partially evacuated according to the procedure referred to previously. The pressure maintained in the chamber 57 can be any suitable pressure up to the dispensing pressure of the beverage but is preferably not too great a fraction of that pressure. Since the pressure exerted by the air in the closed diaphragm chamber 57 will vary directly with the temperature of the chamber, but at a rate less than the variation with temperature of the pressure in the beverage chamber, the apparatus will in this instance be somewhat, although not completely, self-compensating for changes in temperature of the beverage. As a matter of fact, this self-compensation for change in temperature will exist to a considerable degree when means are provided, e.g. a threaded plug, for merely closing the upper end of the conduit 61 to prevent the passage of air into or out of the chamber 57 as the temperature of the beverage and, therefore, of the chamber 57, varies even though no attempt is made to charge the chamber 57 with air under super-atmospheric pressure. Obviously, the chamber 57, when maintained in a closed condition, can be charged with carbon dioxide or with any other suitable gas in place of air. Also, if desired, the chamber can be maintained at less than atmospheric pressure.

When the pressure in the chamber 57 is maintained at a super-atmospheric pressure, it is clear that a lighter spring 78 can be used than is the case when the pressure in the chamber is only at atmospheric pressure, or less. In certain instances this may be desirable to render the apparatus somewhat more sensitive to changes in pressure in the beverage chamber at the dispensing temperature.

A further modification contemplates a substantially complete compensation for changes in temperature in the beverage chamber which can be accomplished in a number of ways. One such way comprises the inclusion of a temperature-sensitive element within the diaphragm chamber along with the diaphragm spring 78 by means of which the tension on the spring is caused to vary directly with temperature. Thus, a temperature-sensitive element, such as a bimetallic spiral of suitable characteristics, or the like, can be inserted in the chamber to encircle the diaphragm rod 74 at one end of the spring either between the spring and the diaphragm or between the spring and the tensioning runner. By choosing a temperature-sensitive element which will shorten the space occupied by the spring and increase the pressure on the diaphragm at essentially the same rate with respect to change in temperature as the rate at which the pressure exerted by the beverage on the opposite side of the diaphragm changes with respect to change in temperature, essentially complete compensation of the functioning of the apparatus over any suitable temperature range can be effected and the carbonation of the beverage maintained essentially constant regardless of its fluctuation in temperature. If desired, the diaphragm spring itself can be the bimetallic element which can function both as a spring and as the temperature compensating element.

Another suitable modification for effecting temperature compensation of the apparatus, and, also, for adapting it to use with essentially any carbonated beverage without any adjustment, comprises constructing the diaphragm chamber of any suitable size and configuration and arranging it so that a portion of the properly carbonated beverage introduced into the beverage chamber will flow into the diaphragm chamber and remain sealed therein during dispensing of essentially all, or most, of the beverage from the beverage chamber. No diaphragm spring is required in such a modification. Since, in this instance, the same beverage exerts pressure on the opposite sides of the diaphragm, and since the portions of the beverage in the diaphragm chamber and in the beverage chamber will always be at essentially the same temperature, any drop in pressure in the beverage chamber due to the dispensing of a part of the beverage therefrom will result in a flexing of the diaphragm and the admission of carbon dioxide into the beverage chamber regardless of the temperature prevailing in the container. This modification, therefore, insures a constant degree of carbonation of the beverage in the beverage chamber throughout the entire dispensing operation entirely independently of the temperature prevailing in the container. A suitable arrangement of valves in the top and bottom of the diaphragm chamber is preferably employed such that while the beverage chamber is being filled the diaphragm chamber is open at the top and bottom, thus permitting free flow of some of the beverage into it and insuring that the beverage in it is of the proper degree of carbonation. A suitable mechanism can be employed such that, when the filler plug is inserted after the beverage chamber has been filled, it actuates the valves in the top and bottom of the diaphragm chamber closing them completely and insuring that there will be no leakage of gas or liquid between the beverage and diaphragm chambers. By a suitable float arrangement actuating the valve at the bottom of the diaphragm chamber, provision can be made for draining the diaphragm chamber into the beverage chamber when the latter is nearly empty so that the beverage contained in the diaphragm chamber can then be dispensed and is not wasted.

In a variation of the modification just described, the diaphragm chamber can be filled with a carbonated liquid, such as the beverage being dispensed, or even with carbonated water containing the proper proportion of dissolved carbon dioxide, and sealed permanently. Under such conditions the sealed body of carbonated liquid in the diaphragm chamber remains therein from one filling of the container to the next and serves as an effective actuator of the diaphragm, provided the rate of change with respect to temperature of the pressure exerted by it on the diaphragm is essentially the same as that of the beverage in the beverage chamber. Since pressure changes of carbonated water and of most carbonated beverages with respect to temperature are essentially the same for the same degree of carbonation, the use of carbonated water in the diaphragm chamber in this modification offers some advantages over the use of the carbonated beverage itself as being less subject to chemical change upon long use than might be the case with a carbonated beverage containing organic compounds of various sorts which might not be too stable upon long usage. Regardless of whether or not a carbonated beverage or carbonated water, or any other carbonated liquid, is used in the diaphragm chamber, and regardless of whether or not the chamber is sealed permanently or refilled each time the beverage chamber is refilled, it is advisable to arrange the diaphragm chamber so that a certain amount of vapor space is included above the liquid in it to duplicate as nearly as possible the conditions existing in the beverage chamber and to avoid any possible effect of hydrostatic pressure from within the diaphragm chamber on the diaphragm.

Still a further modification of the apparatus contemplates the separation of the entire container into two chambers of convenient, but often equal, size which can, for convenience, be referred to as "first" and "second" beverage chambers, respectively. A beverage carbonated to the optimum degree for dispensing is introduced into the first beverage chamber and dispensed therefrom as desired. The second beverage chamber is filled with the same beverage as that charged into the first beverage chamber except that the beverage in the second chamber is deliberately overcarbonated to serve as a source of carbon dioxide replacing the gas chamber shown in the modifications of the drawing of this application. A suitable valved communication is provided between the first and second beverage chambers which, upon opening the valve slightly, permits overcarbonated beverage from the second beverage chamber to flow into the first beverage chamber. Thus, by suitable actuation of the valve as beverage is dispensed from the first beverage chamber, sufficient overcarbonated beverage from the second beverage chamber is permitted to flow into the first beverage chamber where it mixes with the undispensed beverage therein and maintains the mixture at the desired degree of carbonation. By regulating carefully the degree to which the beverage introduced into the second beverage chamber is overcarbonated, the requisite degree of overcarbonation depending to a considerable extent upon the relative capacities of the first and second beverage chambers, the apparatus functions smoothly to provide for dispensing all of the beverage originally in both the first and second chambers without appreciable variation in the degree of carbonation of the dispensed beverage.

The valve between the first and second beverage chambers can be actuated in any suitable way responsive to change in pressure in the first beverage chamber, e.g. in any of the ways described herein for actuating the valve permitting flow of carbon dioxide into the beverage chamber. One preferred way comprises the provision of a suitable diaphragm chamber adapted to contain a quantity of the beverage being dispensed, in the way referred to in the preceding paragraphs, with the diaphragm chamber side of the diaphragm being subjected to the pressure exerted by this quantity of properly carbonated beverage and the opposite side of the diaphragm being subjected to the pressure prevailing in the first beverage chamber from which beverage is being dispensed. The valve and diaphragm rod are arranged in such a way that a drop in pressure in the first beverage chamber over the pressure prevailing in the diaphragm chamber causes the valve to open and allow overcarbonated beverage to flow into the first beverage chamber until the pressure therein is again equalized with the pressure in the diaphragm chamber. With such an arrangement, the flow of overcarbonated beverage from the second beverage chamber into the first beverage chamber will occur automatically, because of the higher pressure existing in the second beverage chamber containing overcarbonated beverage, whenever the valve between the two chambers is opened in response to the flexing action of the diaphragm. By overcarbonating the beverage in the second beverage chamber accurately to the required degree, and providing for drainage of the beverage contained in the diaphragm chamber when the first beverage chamber is almost empty in the way mentioned previously, this modification furnishes means whereby the capacity of the container can be utilized to the fullest extent possible for containing actual dispensable beverage since no part of the container is taken up by a gas-chamber or by a diaphragm chamber containing a product other than the beverage itself.

It will be noted that, employing this modification, the amount of carbon dioxide which should be dissolved in the beverage in the second beverage chamber should be that required to carbonate it to the requisite degree for dispensing and, in addition, an amount of carbon dioxide sufficient to fill both the first and second beverage chambers with gaseous carbon dioxide at the dispensing temperature and pressure. From this it follows that the maximum pressure existing in the freshly filled container, which will be the pressure in the second beverage chamber, will vary directly with the ratio of the capacity of the first beverage chamber to the capacity of the second beverage chamber. For this reason it may sometimes be advisable to construct the apparatus with the capacity of the first beverage chamber relatively small and the capacity of the second beverage chamber relatively large to decrease to a practical minimum the necessary degree of overcarbonation of the beverage introduced into the beverage chamber. Any such decrease in the degree of overcarbonation required will decrease to a minimum any possible adverse effect on the beverage which might accrue to its deliberate overcarbonation, will reduce to a minimum any tendency to excess foam formation in the first beverage chamber upon admission of portions of the overcarbonated beverage thereto and will, in addition, reduce the over-all weight and strength of the container required. It will be seen that, employing this modification, the maximum internal pressure which the container must be constructed to withstand at the dispensing temperature can be reduced to only a few pounds per square inch more than the actual dispensing pressure.

It has been noted in the foregoing description and discussion that in many instances a carbonated beverage can be poured into the apparatus with which the invention is concerned at a temperature of 30 to 32° F. without undue loss by vaporization of carbon dioxide dissolved in the beverage. It is, of course, to be understood that, although a temperature of 30 to 32° F. has been mentioned in this connection, the beverage should not be cooled sufficiently to initiate freezing before it is poured into the container. Certain carbonated beverages contain sufficient dissolved sugar or other substances to lower the freezing point of the beverage for one or two degrees, or even more, below the freezing point of pure water and it is for this reason that such beverages can be cooled slightly below 32° F. without causing ice crystals to form in them. The dissolved carbon dioxide in such a beverage also contributes in some measure to such lowering of the freezing temperature of the beverage.

The invention also contemplates the use of the apparatus for the dispensing of beverages which may be carbonated to such a degree that they must be kept under a pressure which is at least somewhat greater than atmospheric pressure even at the freezing point of the beverage to avoid loss by volatilization of an appreciable amount of the dissolved carbon dioxide. This is especially true in instances such as those mentioned herein wherein a certain amount of overcarbonation of at least a part of the beverage to be dispensed is practiced. Furthermore, it may at times be desirable to charge the beverage into the container without first cooling it to a temperature such that the carbon dioxide dissolved in it exerts no more than atmospheric pressure even in instances where this can be done.

The present invention, therefore, contemplates, as one modification, means for introducing a carbonated beverage into a beverage chamber while maintaining it under a required super-atmospheric pressure. This is accomplished by providing a filler plug containing a pair of valves through one of which a carbonated beverage can be introduced into the beverage chamber and through the other of which gas, e.g. carbon dioxide, can be purged from the beverage chamber while liquid beverage is being introduced into it. Both valves are adapted to remain closed normally. A suitable beverage supply fitting is provided which, when connected to the filler plug, opens both the valves and provides non-interconnecting communications, e.g. by way of suitable conduits, with a source of carbonated beverage by way of the one valve and with a receptacle for the purged gas by way of the other valve. In one variation of the filling procedure, the beverage chamber is first flushed with carbon dioxide until essentially only pure carbon dioxide remains in it and the chamber is then pressurized with carbon dioxide to the desired transfer pressure, i.e. to the pressure under which it is desired that the beverage be introduced into the chamber. The fitting on the beverage supply line is then connected to the filler plug. One of the conduits in the fitting connected to the filler plug communicates, by way of a suitable shut-off valve or other appropriate apparatus for controlling the flow of liquid beverage, with a liquid beverage storage or measuring vessel in which liquid beverage is contained under the transfer pressure. The other conduit in the fitting communicates, by way of a suitable conduit, which can also be valved if desired, with the same storage or measuring vessel as the first conduit but with the vapor space above the liquid beverage in the vessel. Using this modification, it is thus possible to convey liquid beverage, e.g. by gravity or by means of a suitable pump, from the storage or measuring vessel into the beverage chamber under any desired pressure. The fact that the vapor conduit and valve insure the equalization of pressure between the beverage chamber into which beverage is flowing and the vessel serving as a source of beverage permits the beverage to be transferred from the vessel to the chamber without any appreciable variation in the proportion of carbon dioxide dissolved in the beverage.

I claim:

1. In portable dispensing apparatus for dispensing a carbonated beverage, the combination including: a container having therein a beverage chamber adapted to contain a carbonated beverage at a dispensing temperature and pressure and to have successive portions of the beverage dispensed therefrom; a gas chamber inside the container adapted to contain a supply of carbon dioxide gas under a pressure greater than the pressure exerted by the beverage at the dispensing temperature; conduit means inside the container communicating at one of its ends with the gas chamber and at its other end with the beverage chamber and comprising a gas release valve whereby carbon dioxide can be released from the gas chamber into the beverage chamber; and valve-actuating means within the container responsive to change in pressure in the beverage chamber and adapted, when the pressure in the beverage chamber falls below the dispensing pressure, to open the gas release valve and permit carbon dioxide to flow from the gas chamber into the beverage chamber to restore the pressure in the beverage chamber to the dispensing pressure whereby essentially all of a carbonated beverage in the beverage chamber can be dispensed therefrom at essentially the same degree of carbonation, the valve actuating means comprising a mechanically tensioned flexible diaphragm subject on one of its sides to the pressure of the beverage chamber and on its other side to an essentially constant pressure including that of the tensioning means and comprising, further, mechanical means connecting the diaphragm and the carbon dioxide release valve adapted to apply a force to the carbon dioxide release valve to cause it to open when the diaphragm flexes which is greater than the differential of the forces on the two sides of the diaphragm which causes the diaphragm to flex.

2. Apparatus as claimed in claim 1 including means for introducing carbon dioxide into the gas chamber and for introducing a carbonated beverage into the beverage chamber from respective sources thereof outside the container.

3. Apparatus as claimed in claim 1 wherein the gas chamber is adapted to contain carbon dioxide under autogenous pressure in amount sufficient to fill both the beverage chamber and the gas chamber with carbon dioxide gas when at the dispensing temperature and under the dispensing pressure.

4. Apparatus as claimed in claim 2 including a compression spring and wherein the diaphragm is a circularly corrugated diaphragm subject, on its side opposite the side subject to the pressure prevailing in the beverage chamber, at least in part to the pressure of the compression spring.

5. In portable dispensing apparatus for dispensing a carbonated beverage, the combination including: a container having therein a beverage chamber adapted to contain a carbonated beverage at a dispensing temperature and under a dispensing pressure and to have successive portions of the beverage dispensed from the chamber; a gas chamber inside the container adapted to contain a supply of carbon dioxide gas under a pressure greater than the pressure exerted by the beverage at the dispensing temperature; conduit means inside the container communicating at one of its ends with the gas chamber and at its other end with the beverage chamber and comprising a normally closed gas release valve whereby, when the valve is opened, carbon dioxide can be released from the gas chamber into the beverage chamber; a diaphragm chamber located within the container having a wall thereof common with a wall of the beverage chamber; a diaphragm adapted to flex in response to a variation in pressure differential on its two sides located in the common wall and subject on its beverage chamber side to the pressure prevailing in the beverage chamber and on its diaphragm chamber side to an essentially constant predetermined pressure; and leverage means responsive to flexing of the diaphragm in a predetermined manner to cause the gas release valve to be opened whereby the pressure in the beverage chamber can be maintained at essentially a constant dispensing pressure and whereby essentially all of the beverage can be dispensed from the beverage chamber with essentially the same degree of carbonation.

6. Apparatus as claimed in claim 5 including a compression spring located in the diaphragm chamber and wherein the pressure exerted on the diaphragm chamber side of the diaphragm is at least in part due to the spring under compression.

7. Apparatus as claimed in claim 5 wherein the pressure exerted upon the diaphragm chamber side of the diaphragm is at least in part due to a temperature-compensating spring under compression located in the diaphragm chamber whereby the pressure exerted on the diaphragm varies with the temperature to approximately the same degree as that with which the pressure of the beverage on the beverage chamber side of the diaphragm varies with the temperature.

8. Apparatus as claimed in claim 5 including a mechanical pressuring means located in the diaphragm chamber and wherein the pressure exerted on the diaphragm chamber side of the diaphragm is the sum of the pressure exerted thereon by a gas in the diaphragm chamber and the pressure exerted thereon by the mechanical pressuring means.

9. Apparatus as claimed in claim 8 wherein the diaphragm chamber is unsealed with respect to the atmosphere and is filled with air at atmospheric pressure.

10. Apparatus as claimed in claim 8 wherein the diaphragm chamber is sealed with respect to the atmosphere and contains a gas.

References Cited in the file of this patent
UNITED STATES PATENTS

| | | |
|---|---|---|
| 1,946,962 | Block | Feb. 13, 1934 |
| 1,959,815 | Corcoran | May 22, 1934 |
| 2,009,467 | Amsdell | July 30, 1935 |
| 2,571,433 | Fine et al. | Oct. 16, 1951 |
| 2,812,109 | Wentz | Nov. 5, 1957 |
| 3,006,515 | Midnight | Oct. 31, 1961 |

Dedication

3,128,019.—*Lindley E. Mills*, Kalamazoo County, Mich. PORTABLE BEVERAGE DISPENSER. Patent dated Apr. 7, 1964. Dedication filed June 26, 1968, by the inventor.
Hereby dedicates said patent to the Public.
[*Official Gazette November 19, 1968.*]